Dec. 9, 1969     H. L. WALDMAN     3,483,018
EXTENSIBLE ADHESIVE TAPE
Filed Nov. 7, 1966     2 Sheets-Sheet 2
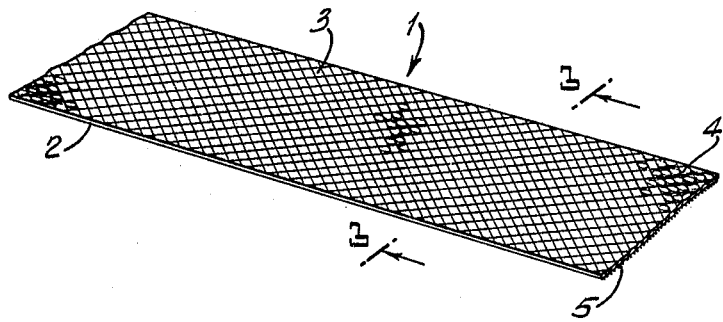
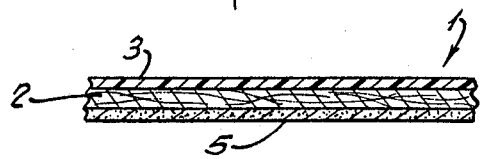
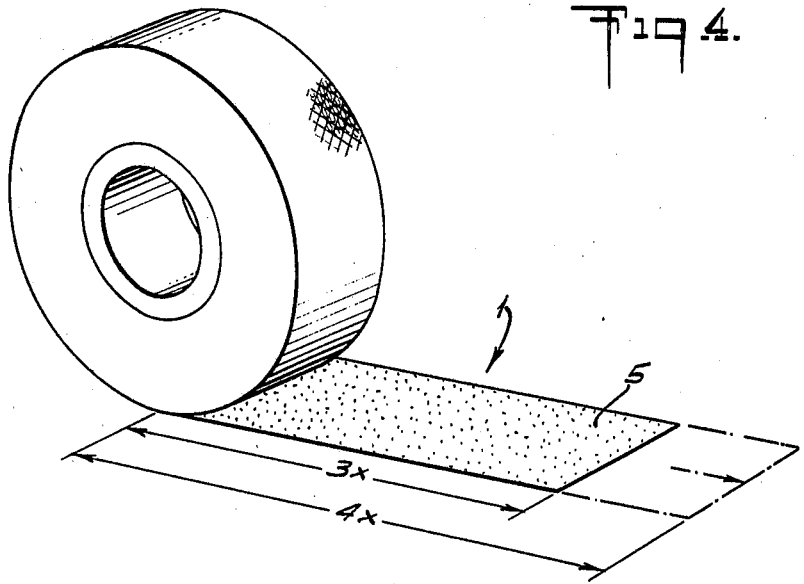
INVENTOR.
HAROLD L. WALDMAN
BY
Nicholas A. Gallo, III
ATTORNEY United States Patent Office 3,483,018
Patented Dec. 9, 1969

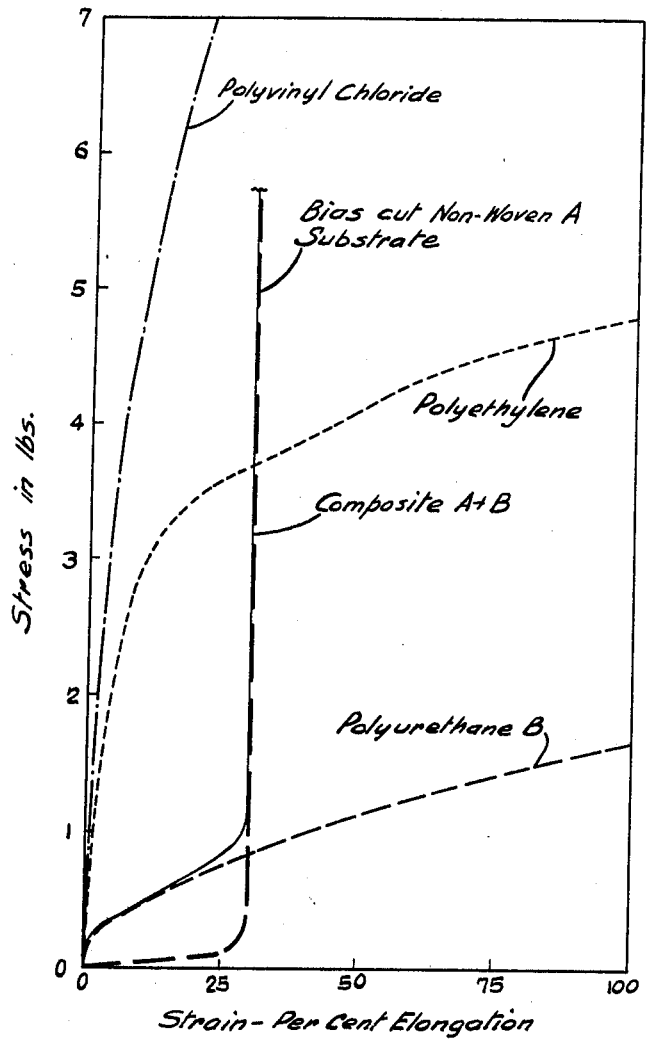

3,483,018
EXTENSIBLE ADHESIVE TAPE
Harold L. Waldman, East Brunswick, N.J., assignor to Johnson & Johnson, a corporation of New Jersey
Filed Nov. 7, 1966, Ser. No. 592,393
Int. Cl. C09j 7/00; B44d 1/14
U.S. Cl. 117—68.5                    10 Claims

ABSTRACT OF THE DISCLOSURE

Pressure sensitive adhesive tapes used for application to the skin, particularly where applied to areas such as fingers, elbows, knees and the like, are subject to stretching and, to a lesser degree, constriction and other distortion during normal activities. The adhesive tape should easily stretch with the skin and thus substantially follow the changing contours of the skin. In this way relative movement between the tape and the skin is minimized with improved wear, comfort, and reduced mechanical irritation to the skin. This is accomplished by preparing tapes having a composite backing formed of an extensible substrate, preferably fibrous, having an effective maximum elongation of from about 20% to about 50% with an elastomeric coating on at least one surface of the substrate, the elastomeric coating having (a) a unitary width elastic modulus of from about 0.36 to about 1.50 pounds per inch width by ASTM Test D-882 in the range of from about 0 to about 20% elongation, (b) a unitary width elastic modulus of from about 0.36 to about 3.65 pounds per inch width in the range of from about 0 to about maximum effective elongation of the substrate, and (c) a relaxation time of no less than about 10 minutes in the range of from about 0 to about maximum elongation of the substrate; and a pressure sensitive adhesive coating on at least one side of the composite backing. The combined unitary width elastic modulus of the substrate, the elastomeric coating, and the adhesive is from about 0.36 to about 3.65 pounds per inch width in the range of 0 to about maximum elongation of the substrate and from about 0.36 to about 1.50 pounds per inch width in the range of 0 to 20% elongation.

This invention relates to pressure sensitive adhesive tapes and more particularly to pressure sensitive adhesive tapes for use on the human body.

The term "unitary width elastic modulus" as used in the specification and claims is defined as the stress required to cause a given strain in a tape portion one inch in width divided by that strain.

It has been found that during daily activities portions of the skin of the human body normally become stretched by up to about 20% or 30%, and at times, skin stretching of up to even about 50% may occur. In light of this finding, it has been determined that the ideal pressure sensitive adhesive tape for use on the human body should have a relatively low unitary width elastic modulus at elongations of from about 0 to at least about 20% or 30% and preferably to about 50% of its normal length.

Thus, when the tape is used on skin areas, such as that of the fingers, elbows and knees, which are subjected to stretching and, to a lesser degree, constriction and other distortion during normal activities, the adhesive tape will easily stretch with the skin and thus substantially follow the changing contours of the skin. If the relative movement between the tape and the skin is thus minimized, the wearer will be more comfortable and mechanical irritation will be substantially eliminated since tension on the skin is minimized. There will also be little shifting of the adhesive with respect to the skin, thus lengthening the adhesive life of the tape and reducing objectionable transfer of the adhesive from the tape to the skin.

While the tape should have a relatively low unitary width elastic modulus at low elongations, it is important that the tape in fact have a significant unitary width elastic modulus. Because of this elasticity, when the tape is unwound from the roll and applied to the body in the usual fashion with some consequent stretching of the tape, the elastic force will provide the tape with a slight tendency to constrict and thus the applied tape will tend to constrict as well as stretch to follow the skin contours. In addition, when the tape is stretched, the elasticity will tend to return the tape more rapidly to its normal shape and position.

In this same regard, such an extensible adhesive tape should also have a moderately long relaxation time from up to at least about 20%, and preferably at least about 30% elongation. Relaxation time is herein defined as the time required for the elastic force to dissipate to 36.79% of its original level at a given degree of elongation. Thus, when the tape having a relatively long relaxation time is stretched during use and held in a stretched position for a period of time, it will not lose a major portion of its elasticity and it will still tend to regain its original length and shape and thus minimize objectionable "bagging" or other permanent deformation of the tape. The tape should, however, not have too long a relaxation time since the same is applied to the body with tension and would thus exert a continued constrictive force unless the force is dissipated at least somewhat.

Even though the tape should have a relatively low unitary width elastic modulus between 0 and about 30% elongation (the degree of stretching normally encountered in use) and preferably at up to about 50% elongation (the degree of stretching possibly encountered during more strenuous activity), there should be a rapid increase in this modulus through the upper portion of the 0 to 50% elongation range. Above about 50% elongation, the unitary width elastic modulus should be quite high, so that the tape can be said to be effectively nonextensible above at most about 50% elongation—that is, 50% is the effective maximum elongation. By "effecitve maximum elongation" as used hereinafter in this specification and claims, it is meant that degree of elongation at which the unitary width elastic modulus first exceeds about 3.65 pounds per inch width. This property permits easy unwinding and handling of the tape which may otherwise be accomplished only with excessive stretching of the same. If the unitary width elastic modulus of the extensible tape is low at high elongation, the tape cannot be applied snugly to the body without a substantial amount of tension, this tension subsequently causing discomfort to the patient.

In addition to the desired elastic properties of a pressure sensitive adhesive tape, the tape should have a relatively high moisture vapor transfer rate so that perspiration and other fluids on the surface of the skin may be transmitted through the tape thus preserving the adhesive properties of the adhesive mass and adding to patient comfort.

It has been further found that tapes utilizing conventional backings have been deficient in one or more of the desired properties described above. This can be most clearly seen by reference to FIG. 1 of the drawings which reproduces a typical stress vs. strain curve for various tape backings one inch in width, the shape of the various curves being particularly significant.

Adhesive tapes having paper or nonwoven backings generally are relatively inextensible and therefore do not stretch or constrict to correspond to the movement of the body. While the paper backings may be compacted by various processes to provide extensibility on the order of up to 30% or more, the paper still has relatively little or no elasticity.

The conventional plasticized polyvinyl chloride film backings have a rapidly increasing unitary width elastic modulus over the range of 0 to about 5% elongation and therefore do not stretch easily within the degree of stretch, i.e., about 30%, encountered in normal use.

Polyethylene and other polyolefin film backings have a somewhat lower unitary width elastic modulus from 0 to about 30% elongation than the vinyl films. However, the modulus of the film is still too high to be completely satisfactory for a tape to be used on the body. Polyethylene film also has a unitary width elastic modulus which is too low in the 50% to 100% elongation range. In addition, the polyolefins have a relatively low yield point so that once the tape is substantially deformed, it will not resume its normal shape and length. Below the yield point, polyethylene tapes have such a long relaxation time that they exert a substantial constrictive force when wrapped with tension on a body member.

Polyurethanes have also been suggested for use as tape backings, however, the unitary width elastic modulus of the polyurethanes is far too low both above elongations of 30% and above elongations of 50% to be used as a tape backing, it being very difficult to unwind the tape from a roll and to apply it snugly to the body without excessive tension.

According to this invention, tapes are provided having properties approximating the earlier described optimum tape properties. These tapes comprise (1) an extensible subsrtate, preferably fibrous, having an effective maximum elongation of from about 20% to about 50%; (2) an elastomeric coating on at least one surface of the substrate, the elastomeric coating having (a) a unitary width elastic modulus of from about 0.36 to about 1.50 pounds per inch width by ASTM Test D–882 in the range of from about 0 to about 20% elongation, (b) a unitary width elastic modulus of from about 0.36 to about 3.65 pounds per inch width in the range of from about 0 to about maximum effective elongation of the substrate, and (c) a relaxation time of no less than about 10 minutes in the range of from about 0 to about maximum elongation of the substrate; and (3) a pressure sensitive adhesive coating on at least one side of the composite. The combined unitary width elastic modulus of the substrate, the elastomeric coating, and the adhesive is from about 0.36 to about 3.65 pounds per inch width in the range of 0 to about maximum elongation of the substrate and from about 0.36 to about 1.50 pounds per inch width in the range of 0 to 20% elongation.

The invention may be more easily understood by reference to the attached drawings and the following description of the same. In the drawings, FIG. 1 is an ASTM D–882 graph of stress vs. strain for various conventional tape backings and for a composite backing of this invention, all one inch in width;

FIG. 2 is a plan view of an extensible tape of the present invention having a composite backing;

FIG. 3 is a cross section of the tape of FIG. 2 taken along line 3—3;

FIG. 4 is a view in perspecitve of the tape of FIG. 2 wound on itself in roll form and showing additionally the stretching encountered during the removal of the tape from the roll.

Referring now more specifically to FIGS. 2 through 4 of the drawings, there is illustrated an extensible pressure sensitive adhesive tape, 1, having a bias cut diamond shaped open mesh nonwoven fibrous substrate, 2, the same being extensible in the lengthwise direction by virtue of the bias orientation. This is shown most clearly in FIG. 4 where the tape is illustrated being unwound from a roll, the direction of stretch being indicated by the arrow. One surface of the extensible fibrous substrate, 2, is a 1-mil thick polyurethane coating, 3, which is relatively continuous and covers substantially all of the diamond shaped interstices of the fibrous substrate forming "windows," 4, over the same. The polyurethane coating, 3, has a relatively high moisture vapor transfer rate and therefore the "windows," 4, provide the pressure sensitive adhesive tape 1 with ready breathability. A pressure sensitive adhesive coating, 5, also having a high moisture vapor transfer rate, on the opposite side of the fibrous substrate provides the tape with its adhesive properties.

The fibrous substrate, 2, has an effective maximum elongation of about 30%, a typical stress-strain curve for the same being illustrated in the graph of FIG. 1. In the range of from about 0 to about 30% elongation, the fibrous substrate has an extremely low unitary width elastic modulus, on the order of 0.036 pound per inch width. Therefore, in this range of elongation, the elastic properties of the tape will be primarily, although not entirely, those of the polyurethane film, 3, the latter having a low but significant unitary width elastic modulus of from about 0.75 to about 1.10 pounds per inch width and a long relaxation time. As the elongation of the tape begins to exceed about 28%, the elastic modulus of the composite begins to rise rather rapidly as the properties of the fibrous sheet begin to predominate. At about 30% elongation, the stress-strain curve of the composite follows substantially the stress-strain curve of the bias cut nonwoven sheet.

In a tape having a composite backing of the type illustrated, the substrate may be any extensible substrate which has an effective maximum extensibility of from about 20% to about 50%, the exact extensibility provided depending on the specific intended end use of the tape. Since during normal use an adhesive tape for all purpose use on the body is subjected to elongations of about 30%, in the case of such a tape the substrate should have a maximum elongation of not much less than about 30%. Any freedom of elongation above the maximum expected to be encountered during normal use is undesirable for the reasons relating to the ease of unrolling the tape previously pointed out. For most tapes for use on the body, therefore, the substrate preferably has a maximum effective elongation of from about 25% to about 35%.

The substrate must also have unitary width elastic moduli at various elongations which do not exceed those required of the complete tape which have been previously outlined. The substrate is preferably a fibrous substrate which has extensibility by virtue of its weave or its having been compacted. Thus, the elastic moduli of the substrate alone will be very low and the elastic properties of the complete tape essentially will be controlled by the choice of the proper elastomeric coating. It has been found that the fibrous substrate may advantageously be, for example, a strong paper which has been subjected to a crimping or compacting process, a woven open mesh gauze cut on the bias so that the same is extensible by virtue of the threads of the gauze sliding with respect to one another, or an open mesh nonwoven fabric having a diamond configuration of the type illustrated in the drawings. Normally, extensible fibrous substrates of this type have a very short relaxation time, within the stated degrees of elongation, or in other words, would not return to normal length after substantial extension for even short periods of time. They also have a very low unitary width elastic modulus, on the order of less than about 0.36 pound per inch width, below maximum elongation.

The substrate, fibrous or otherwise, preferably has an ASTM D–697 moisture vapor transfer rate of at least 20 gms. per 100 square inches per 24 hours and preferably at least 40 gms. per 100 square inches per 24 hours so that fluids may be removed from the surface of the skin through the tape. Therefore, while it is not essential, it is desirable that the fibrous substrate be of an open mesh construction, as illustrated, to facilitate this transfer of moisture.

As previously mentioned in the case of a composite tape backing of the type illustrated in the range of from 0 to slightly less than maximum elongation of the substrate, the properties of the backing are primarily but not entirely those of the elastomeric coating. The elastomeric film must have a unitary width elastic modulus in the range of from about 0 to about maximum effective elongation of the substrate of between about 0.36 pound per inch width and about 3.65 pounds per inch width. Preferably the coating has a unitary width elastic modulus of between about 0.75 and about 1.50 pounds per inch width in the range of from about 0 to about 20% elongation. If the fibrous substrate has a discernible elastic modulus, the modulus of the elastomer should be adjusted so that the combined modulus falls within the earlier referred to limits. In order to eliminate "bagging" and permanent distortion of the tape, the elastomeric film must have a relaxation time of at least about ten minutes. While if the relaxation time is much below about ten minutes, excessive permanent distortion will be encountered; if the relaxation time is in excess of about $1 \times 10^6$ minutes, excessive constriction of the tape about the body member may occur. The optimum relaxation time of the elastomeric coating is between about $1 \times 10^2$ minutes and about $1.0 \times 10^5$ minutes.

The elastomeric coating may be of any desired thickness and should have a moisture vapor transfer rate of greater than 20 gms. per 100 square inches per 24 hours and preferably greater than about 40 gms. per 100 square inches per 24 hours or more. In order to obtain moisture vapor transfer rates in excess of about 20 gms. per 100 square inches per 24 hours, it may be necessary to provide the elastomeric film with a number of perforations which are small enough that the adhesive mass will not migrate through the same and cause blocking of the tape rolls but which are large enough to convey water vapor effectively.

While coatings of any thickness may be used, for reasons relating to ease of coating and tape flexibility, films having a thickness of between about 0.5 and about 1.5 mils are preferred. The elastomeric film may consist of any elastomer having the above referred to properties, however, the polyester or polyether based polyurethanes, especially Estane 5703, sold by B. F. Goodrich, are particularly useful since films of this material having a thickness of between 0.5 and 1.5 mils generally have the elastic properties required as previously set forth. Also, polyurethane films which are applied to a fibrous substrate by solvent coating tend, by virtue of their high molecular weight, to blow and therefore the film ruptures as it is formed. Thus, a plurality of pores are formed in the film in conjunction with the coating of the fibrous substrate.

The pressure sensitive adhesive mass may be any of the conventional pressure sensitive adhesive masses such as, for example, the natural and synthetic rubber based adhesive masses or the acrylate and methacrylate based adhesive masses. The coating weight of the adhesive would be well known to those skilled in the art but would usually be between about 0.2 and 0.9 ounce per square yard. In order to preserve the moisture vapor transfer rate of the tape, the adhesive coating should have a moisture vapor transfer rate of at least about 20 gms. per 100 square inches per 24 hours and preferably at least about 40 gms. per 100 square inches per 24 hours, the same being provided either by the inherent transfer properties of the adhesive mass or by perforating the adhesive mass, methods of perforating the same being well known to those skilled in the art.

If it is desired, a conventional release coating may be used on the exposed surface of the elastomeric coating opposite the adhesive mass. However, it is anticipated that no release coating will be necessary, since the degree of adhesion between the adhesive mass and the fibrous substrate is generally substantially greater than the adhesion between the adhesive mass and the elastomeric coating and since the tape has a relatively high elastic modulus at high elongations.

Several specific examples of the invention are described below, however, it is understood they are not to be construed to limit the invention.

EXAMPLE

An acrylic pressure sensitive adhesive mass consisting of a copolymer of 2-ethyl hexyl acrylate and vinyl acetate which is 67 parts acrylate and 33 parts acetate is solvent spread at 40% solids in cyclohexane onto a silicone coated carrier sheet at a coating weight of 1.0 ounce per square yard. A sheet of bias woven 10 x 12 gauze is pressed into firm contact with the pressure sensitive adhesive mass to integrally bond the two together. A 2-ounce per square yard coating of Estane 5703, a polyester based polyurethane (having a specific gravity of 1.20 by ASTM Test D 12–27, forming films having a durometer A hardness of 70 by ASTM Test D–676, having a tensile strength of greater than 5,000 by ASTM Test D–412, having an elastic modulus at 300% elongation of about 500 pounds per ounce per square yard by ASTM Test D–882, and having a minimum elongation before break of about 700%) is solvent coated at 35% solids in methyl ethyl ketone on the exposed side of the composite of adhesive and gauze. The tape is dried at 250° F. for about 2 minutes to remove all of the solvent from the same and the completed tape is then stripped from the carrier sheet.

The bias woven gauze used has an effective maximum elongation of 50% and has virtually zero elastic modulus and zero relaxation time in the range of from 0 to slightly less than maximum elongation. The completed tape has an ealstic modulus of from 0.36 to 0.77 pound per inch width in the range of 0 to 30% elongation and has an elastic modulus of between 0.36 and 0.91 pound per inch width in the range of 0 to 50% elongation. The tape has a relaxation time from 30% elongation of $3.2 \times 10^4$ minutes. The complete tape also has a moisture vapor transfer rate of about 60 gms. per 100 square inches per 24 hours to the holes inherently formed in the polyurethane film applied in the 35% solids solution.

The completed tape is wound on a roll and after aging it may be easily unwound despite the absence of a release coating, the tape being removed with only a small amount of tension. The tape is applied around the arm of a patient at the elbow, again with only a small amount of tension and stretching of the film, and there is a slight but firm constriction of the tape around the arm of the patient after it has been applied. As the arm is bent forward and backward, the tape continues to conform to the shape of the elbow with only minimal tension on the skin of the patient. Virtually no offset of adhesive from the tape to the skin occurs. The tape is used for a number of days without any bagging or breaking being noted, and after this time, the patient finds the tape to be as comfortable during his movements as immediately after its application.

Although specific embodiments of the invention have been presented, they have only been presented to better describe the inventive concept and should not be construed to limit the invention.

What is claimed is:

1. An extensible pressure sensitive adhesive sheet having an effective maximum elongation of from about 20% to about 50%, a low and significant elastic modulus from about zero to at least about 20% elongation and a moderately long relaxation time comprising an extensible backing having an effective maximum elongation of between about 20% and about 50% in the lengthwise direction and a pressure sensitive adhesive coating on at least one surface of said backing, said backing having (1) a unitary width elastic modulus of from about 0.36 pound per inch width to about 3.65 pounds per inch width at elongations of from about zero to about its effective maximum elongation, (2) a unitary width elastic modulus of from about 0.36 to about 1.50 pounds per inch width at elongations of from about zero to about 20% elongation, and (3) a relaxation time of no less than about 10 minutes at elongations of from about zero to about the effective maximum elongation of said backing.

2. An extensible pressure sensitive adhesive sheet having an effective maximum elongation of from about 20% to about 50%, a low and singificant elastic modulus from about zero to at least about 20% elongation, and a moderately long relaxation time comprising, an extensible substrate having an effective maximum elongation of between about 20% and about 50% in the lengthwise direction, an elastomeric coating on at least one surface of said substrate, and a pressure sensitive adhesive coating on at least one surface of the composite of substrate and elastomeric coating, said elastomeric coating having (1) a maximum elongation of no less than the effective maximum elongation of said substrate, (2) a unitary width elastic modulus of from about 0.36 pound per inch width to about 3.65 pounds per inch width at elongations of from about zero to about the effective maximum elongation of said substrate, (3) a unitary width elastic modulus of from about 0.36 to about 1.50 pounds per inch width at elongations of from about zero to 20%, and (4) a relaxation time of no less than about 10 minutes at elongations of from about zero to about the effective maximum elongation of said substrate, the combined unitary width elastic modulus of the elastomeric coating, the substrate, and the adhesive being no greater than about 3.65 pounds per inch width at elongations of from about zero to about the effective maximum elongation of said substrate and no greater than about 1.50 pounds per inch width at elongations of less than about 20%.

3. The adhesive sheet of claim 2 in which said substrate is a fibrous substrate having an effective maximum extensibility of from about 25% to about 35% and a unitary width elastic modulus at elongations below about its effective maximum elongation of no greater than about 0.36 pound per inch width, and in which the unitary width elastic modulus of said elastomeric coating is from about 0.75 pound per inch width and about 1.50 pounds per inch width at elongations of from about zero to the maximum elongation of said substrate, and in which the relaxation time of said elastomeric coating is between $1 \times 10^2$ and about $1 \times 10^5$ minutes at an elongation of between about zero and about the maximum elongation of said substrate.

4. The pressure sensitive adhesive tape of claim 3 in which said fibrous substrate is a paper sheet which has been compacted in the lengthwise direction.

5. The pressure sensitive adhesive tape of claim 3 in which said fibrous substrate is an open mesh nonwoven substrate which has been crimped in the lengthwise direction.

6. The pressure sensitive adhesive tape of claim 3 in which said fibrous substrate is an open mesh bias cut nonwoven fabric.

7. The pressure sensitive adhesive tape of claim 3 in which each of said elastomeric coating, said fibrous substrate, and said adhesive has a moisture vapor transfer rate of greater than about 20 gms. per 100 square inches per 24 hours.

8. The pressure sensitive adhesive tape of claim 7 in which each of said elastomeric coating, said fibrous substrate, and said adhesive has a moisture vapor transfer rate of greater than about 40 gms. per 100 square inches per 24 hours.

9. The pressure sensitive adhesive tape of claim 2 in which said elastomeric coating is polyurethane.

10. The pressure sensitive adhesive tape of claim 3 in which said elastomeric coating is polyurethane.

References Cited

UNITED STATES PATENTS

| | | | |
|---|---|---|---|
| 2,349,710 | 5/1944 | Evans | 128—156 X |
| 2,940,591 | 6/1960 | Swedish et al. | |
| 2,954,868 | 10/1960 | Swedish et al. | 117—68.5 X |
| 3,015,597 | 1/1962 | Lambert | 117—122 |
| 3,055,496 | 9/1962 | Dunlap | 117—68.5 X |
| 3,073,303 | 1/1963 | Schaar | 128—156 |
| 3,085,572 | 4/1963 | Blackford | 117—122 X |
| 3,132,984 | 5/1964 | Davies | 128—156 X |
| 3,197,330 | 7/1965 | Bartell | 117—68.5 X |
| 3,232,291 | 2/1966 | Parker | 128—156 |
| 3,385,829 | 5/1968 | Heydkamp et al. | 117—161 X |

WILLIAM D. MARTIN, Primary Examiner

B. PIANALTO, Assistant Examiner

U.S. Cl. X.R.

117—122, 155; 128—156